Figure 1:
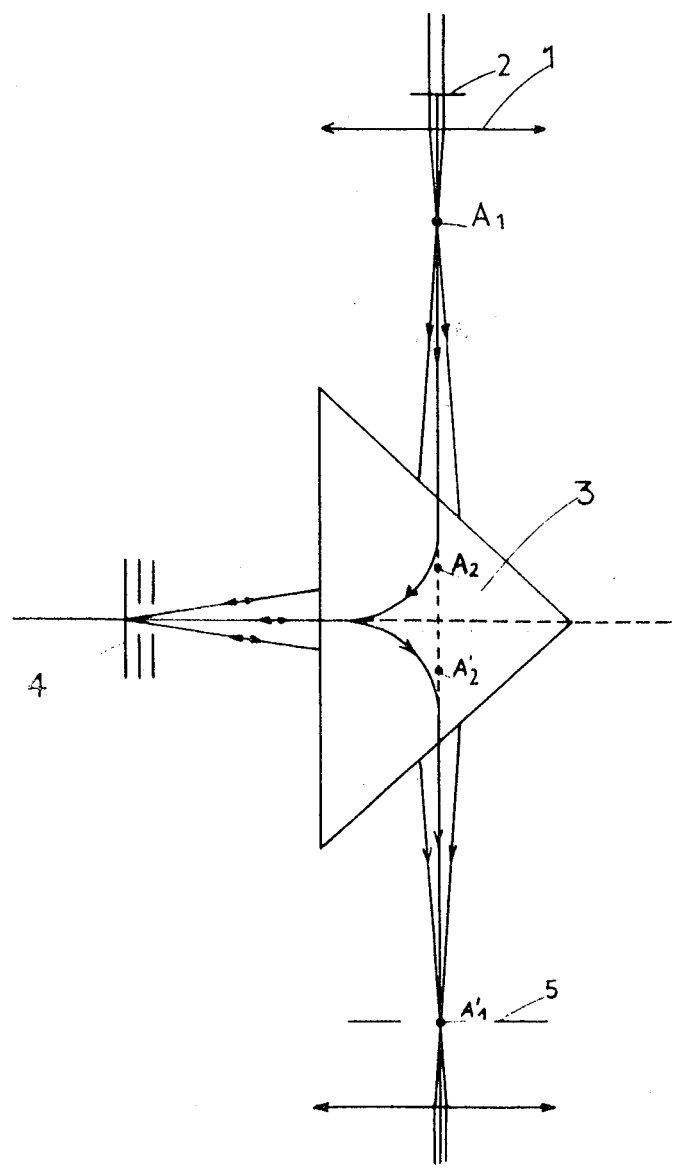

United States Patent [11] 3,624,393

[72] Inventor Emile Torquebiau
  Paris, France
[21] Appl. No. 54,243
[22] Filed July 13, 1970
[45] Patented Nov. 30, 1971
[73] Assignee Societe D'Optique Precision Electronique
  Et Mecanique (Sopelem)
  Paris, France
[32] Priority Aug. 13, 1969
[33] France
[31] 6927880

[54] ELECTRON MICROSCOPE COMPRISING A VELOCITY FILTER SYSTEM
  2 Claims, 2 Drawing Figs.
[52] U.S. Cl....................................................... 250/49.5 A,
  250/49.5 C, 250/49.5 D
[51] Int. Cl....................................................... H01j 37/26,
  H01j 37/12, H01j 37/14
[50] Field of Search............................................ 250/49.5 A,
  49.5 C, 49.5 D

[56] References Cited
OTHER REFERENCES

CEC Type 27- 201 Ion Emission Microanalyzer Nov. 8, 1968; pp. 1 to 21; 250- 49.5 P Primary Examiner—Anthony L. Birch
Attorney—Cameron, Kerkam and Sutton ABSTRACT: In an electron microscope having a velocity filtering system involving reflection in a prism, the normal objective lens is replaced by a complex lens comprising three electrostatic lens elements. This arrangement enables the order of image and diffraction diagram in the propagation path to be reversed, so that the diffraction diagram can be filtered as well as the image.

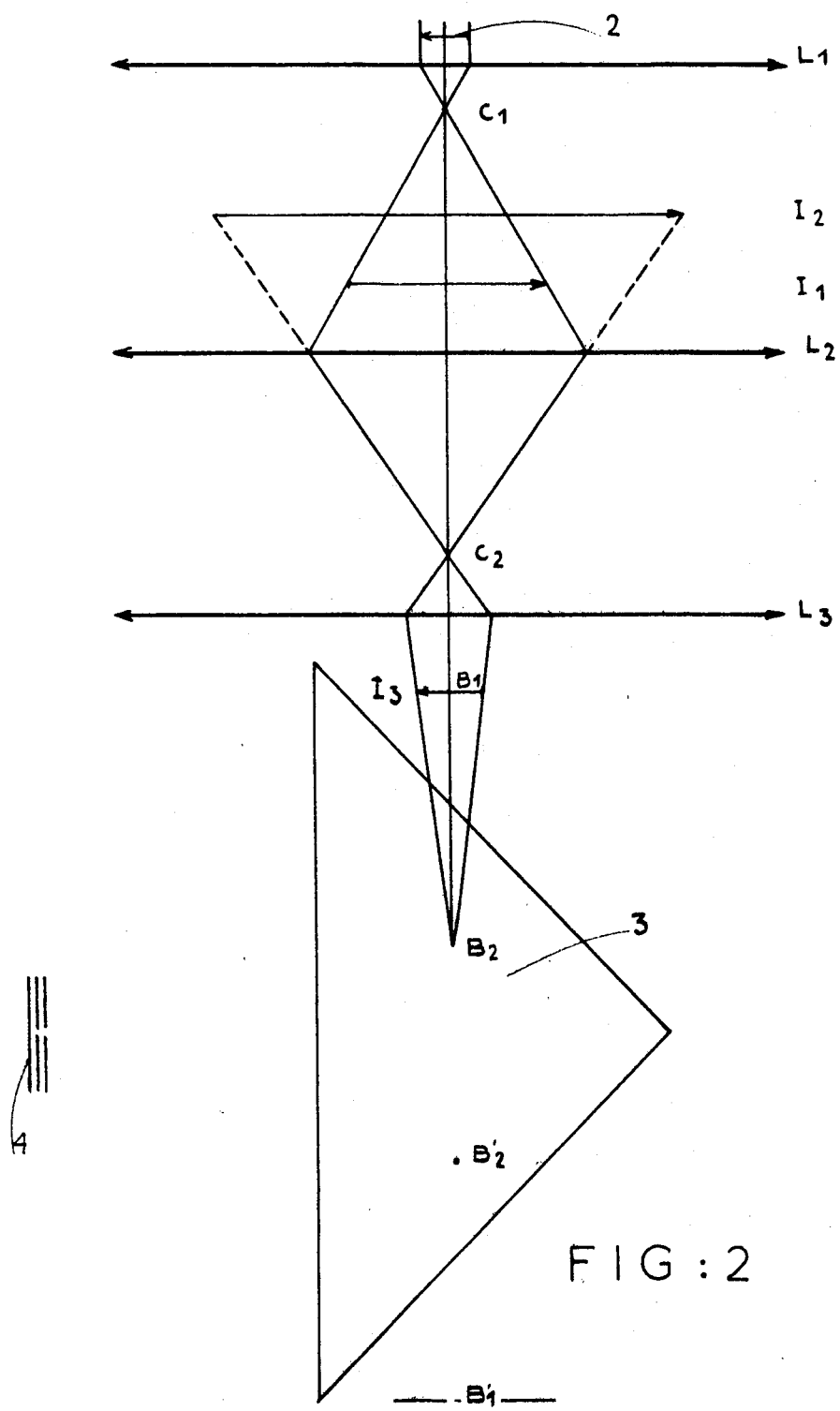
FIG:2

ELECTRON MICROSCOPE COMPRISING A VELOCITY FILTER SYSTEM

This invention relates to an electron microscope comprising a velocity filter system.

Electron microscopes comprising a dispersion system allowing the filtering of the electron images are already known. A system of this kind has been described by R. Castaing and L. Henry in the transactions of the Academie des Sciences en France, Volume 255, pages 76 to 78, Session of July 2, 1962. In a dispersion system of this kind, an electron beam emerging from the lens of an electron microscope undergoes a first deflection in a magnetic prism, then reflection by an electrostatic mirror, and finally a second deflection in the magnetic prism, which brings the beam axis back into line with the axis of the incident beam.

The disadvantage of this system is that although it allows image filtering, it does not provide electron diffraction pattern filtering. If this system is to retain the image quality, the electron diffraction pattern and the image formed by the lens can be situated only at two specific stigmatic points and filtering by means of two movable strips forming a filtering slot can be carried out only at the level of the real image of the electron diffraction pattern provided by the dispersion system, i.e., filtering can be carried out only on the images.

The object of this invention is to allow filtering of the electron diffraction patterns in addition to the images.

The invention provides an electron microscope including a velocity filtering system, comprising a lens, a magnetic prism whose dihedron bisector plane is perpendicular to the lens axis, an electrostatic mirror parallel to the base of the said prism and from which the electron beam is reflected, and a filtering slot, wherein the lens consists essentially of three electronic lens elements which, in the order of propagation of the beam, give an image of the observed object and an electron diffraction pattern, the filtering slot being disposed level with the image of the observed object formed by the prism after reflection from the mirror.

Features and advantages of the invention will become apparent from a study of the following description in conjunction with the accompanying drawings, in which:

FIG. 1 diagrammatically illustrates the known system which provides only filtering of the image of the observed object, and FIG. 2 diagrammatically illustrates a system according to an embodiment of the invention which provides not only filtering of the image of the observed object but also electron diffraction pattern filtering.

FIG. 1 diagrammatically illustrates the known system which comprises an electronic lens 1 behind which the object 2 is disposed. A magnetic prism 3 is disposed in the path of the beam.

The beam forms an electron diffraction pattern at $A_1$, undergoes a first deflection in the prism 3, is then reflected by an electrostatic mirror 4, undergoes a second deflection in the prism 3, and then forms a real image $A'_1$, at the place where the filtration slot 5 is disposed.

A system of this type has two pairs of stigmatic poits on its axis, one of points two pairs being real $A_1$–$A'_1$, the other being virtual $A_2$–$A'_2$.

As will be readily apparent form the drawing, the above system provides filtering only at the image of the observed object at $A'_1$.

FIG. 2 shows an example of the system according to the invention which also provides filtering of the electron diffraction pattern.

In the example of the invention described herein, the lens 1 shown in FIG. 1 is replaced by three electronic lens elements $L_1$, $L_2$ and $L_3$, which allow the positions of the image of the observed object and the electron diffraction pattern of the object to be reversed, i.e., provide a reduced image at $B_1$, and a magnified electron diffraction pattern at $B_2$. Since filtering is carried out at the real point $B'_1$, i.e. at the image of the observed object, it is then possible to filter the electron diffraction pattern.

As in FIG. 1, the system includes a magnetic prism 3 and an electrostatic mirror 4.

This system comprises the first lens element $L_1$ of short focal length, the operation of which is similar to that of a conventional lens. It provides the electron diffraction pattern at $C_1$ and a real image of the observed object at $I_1$. The second lens element $L_2$ has a focal length sufficient to give a virtual image $I_2$ of the real image $I_1$ of the observed object and a real image $C_2$ of the electron diffraction pattern $C_1$. The lens element $L_2$ therefore changes over the relative positions of the image of the observed object and the electron diffraction pattern.

The third lens element $L_3$ places the final image $I_3$ of the observed object at the level of the stigmatic point $B_1$ of the prism and the electron diffraction pattern at the level of the stigmatic point $B_2$ of the same prism.

The stigmatic points $B'_2$ and $B'_1$ shown in FIG. 2 correspond respectively to the stigmatic points $A'_2$ and $A'_1$ in FIG. 1.

In an example of the invention, the first lens element $L_1$ has a focal length $f1$ of 2.72 mm. It provides a diagram $C_1$ of the object 2 at 2.78 mm. from its center, and an image $I_1$ at 105.5 mm. from the same center.

The second lens element $L_2$ is disposed 126 mm. from the first and its focal length $f2$ is 40 mm. This second lens element brings the diagram at $C_2$ to 59 mm. beyond its center and also forms a virtual image $I_2$ situated between the lenses $L_1$ and $L_2$ at 42 mm. from the center of $L_2$.

The third lens element $L_3$ has a focal length of 17.4 mm., and is situated at 80 mm. from the lens element $L_2$. It brings the electron diffraction pattern at $B_2$ at 95 mm. from its center and the final image at $B_1$ at 20 mm. from its center.

With these values, the total reduction of the image of the observed object provided by the lens element $L_1$ is equal to 3 and the magnification of the electron diffraction pattern is 2.15.

The invention is not limited to the precise embodiment described hereinbefore, which may be modified without departing from the scope of the invention.

What we claim is:

1. An electron microscope comprising an objective, a dispersive system, a magnetic prism for said system, the dihedron bisector plane of said prism being perpendicular to the axis of said objective, an electrostatic mirror in said system parallel to the base of said prism, said system having a pair of real and a pair of virtual stigmatic points symmetrically disposed with respect to the axis of said electrostatic mirror, a filter at the real stigmatic point of exit of said prism, said objective comprising a first lens $L_1$ of short focal length, a second lens $L_2$ so arranged that its object focus is located between the image focus of said lens $L_1$ and the plane image of said lens $L_1$, and a third lens $L_3$ so disposed that its object focus is slightly beneath the real image of said lens $L_2$ and so constructed and arranged that the final image of the object observed by said objective is located at the real stigmatic point of entry of said magnetic prism and the final electron diffraction pattern of said objective is at the virtual stigmatic point of entry of said magnetic prism.

2. An electron microscope according to claim 1 said lens $L_1$, having a focal length of 2.72 mm., said lens $L_2$ being disposed at 126 mm. from said lens $L_1$ and having a focal length of 40 mm., and said lens $L_3$ being located at 80 mm. from said lens $L_2$ and having a focal length of 17.4 mm.

* * * * *